3,016,933
POWER OPERATED TOOL ATTACHMENT FOR ELECTRIC DRILLS AND THE LIKE
Thomas B. Keesling, 17480 Shelburne Way, Los Gatos, Calif., assignor of one-half to C. H. Keesling, San Jose, Calif.
Filed Feb. 11, 1957, Ser. No. 639,330
6 Claims. (Cl. 144—35)

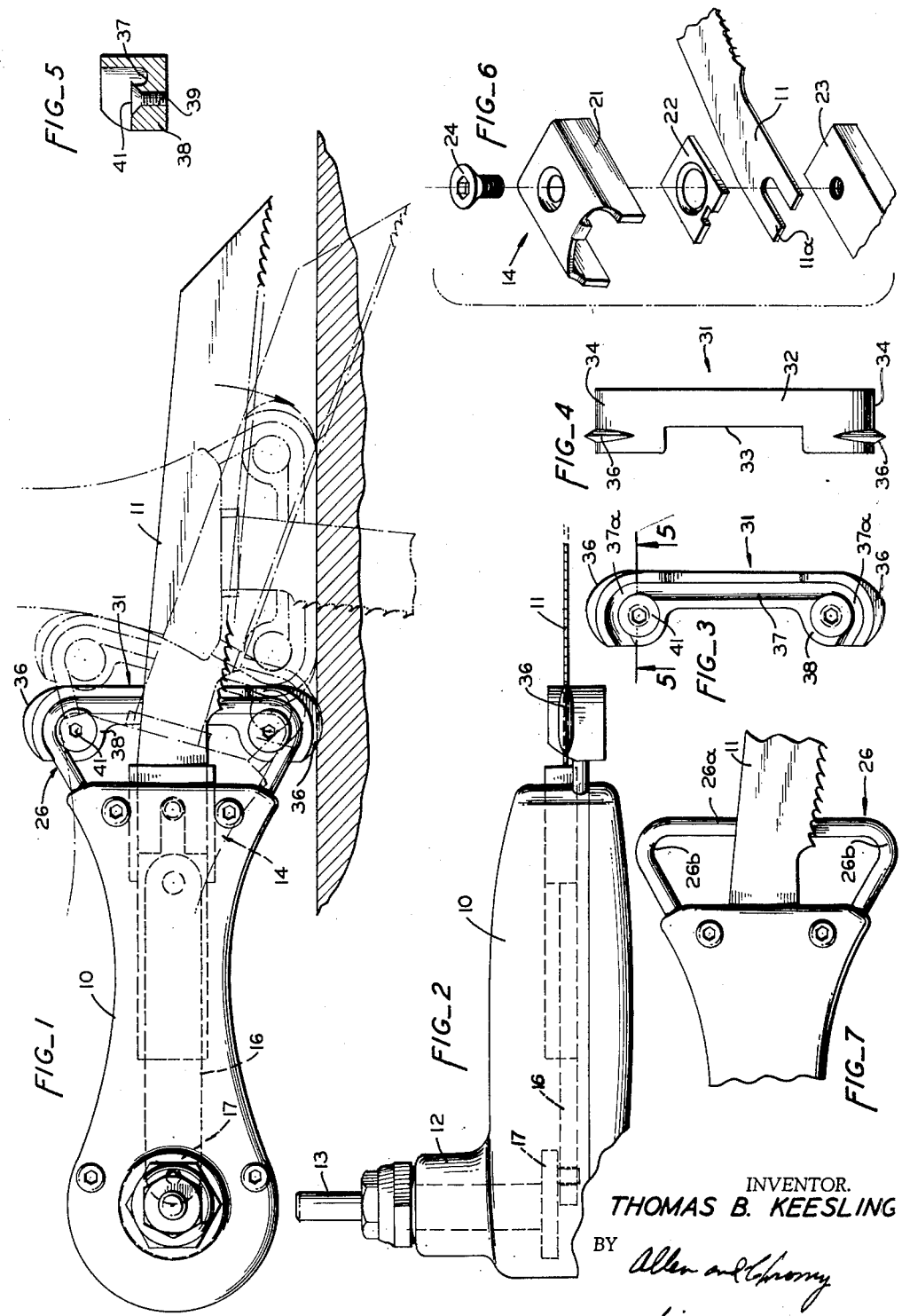
Jan. 16, 1962     T. B. KEESLING     3,016,933
POWER OPERATED TOOL ATTACHMENT FOR ELECTRIC
DRILLS AND THE LIKE
Filed Feb. 11, 1957
INVENTOR.
THOMAS B. KEESLING
BY
his ATTORNEYS

United States Patent Office 3,016,933
Patented Jan. 16, 1962

The present invention relates to power operated reciprocating tools, such as saws, and attachments therefor, and is concerned more particularly with a tool or attachment construction which facilitates entry of the tool into the work, such as for example entry of a reciprocatory saw into an unperforated piece of work.

This application is a continuation in part of my copending application, Serial No. 412,359, filed February 24, 1954, issued March 5, 1957 as Patent No. 2,793,790.

It is a general object of the invention to provide a power operated tool such as a saw which is constructed to facilitate entry of the saw into an unperforated piece of work.

Another general object of the invention is to provide a power operated tool of the above character incorporating means for engaging the work to fix the position of and to guide the tool with reference to the work piece, particularly in effecting penetration of the work.

Another object of the invention is to provide a power operated saw incorporating a work penetrating fin which penetrates the work to fix the saw in position in a location in which the indentation or mark of the fin is later removed by the saw.

A further object of the invention is to provide a tool obtaining the foregoing objects and which can be used for either right hand or left hand gripping.

Other objects and advantages of the invention will be apparent from the following description of the preferred embodiment of the invention, as illustrated in the accompanying drawings, in which:

FIGURE 1 is the side elevational view of a tool embodying the invention with certain portions of the figure shown in dotted or phantom lines.

FIGURE 2 is a fragmentary bottom plan view of the tool shown in FIGURE 1.

FIGURE 3 is a side elevational view of the shoe attachment of the tool as viewed in FIGURE 1 but with the tool omitted for clarity of illustration.

FIGURE 4 is an end elevational view of the shoe attachment as viewed from the right of FIGURE 3.

FIGURE 5 is a fragmentary sectional view taken as indicated by the line 5—5 in FIGURE 3.

FIGURE 6 is an exploded view of certain securing parts for holding the tool or saw in place.

FIGURE 7 is a fragmentary elevational view similar to FIGURE 1 illustrating the tool and the work engaging shoe to which the shoe attachment is secured.

The invention is illustrated in connection with the type of power operated hand controlled tool disclosed in my said application and this tool comprises a body 10, which is formed as a hand grip and has projecting therefrom at one end a tool or saw blade 11, and at its other end is provided with a lateral projection or boss 12 in which a chucking shaft 13 is journaled, the chucking shaft being adapted to be received in the chuck of a hand drill or a flexible shaft drive unit. The saw blade 11 is mounted in a reciprocatory head 14 of the tool and is connected by a reciprocatory link 16 with an eccentric 17 driven by and co-axial with the chucking shaft 13. The head 14 (FIGURE 6) comprises a channel shaped clamping and guide member 21, and an insert plate or spacer 22 which seats within the channel shaped clamping or guide member 21. The spacer 22 engages one side of the saw blade 11 and the other side of the saw blade is engaged with a slide member 23 to which the link 16 is pivotally secured, all of these parts being of the character shown and described in my said application. A clamping screw 24 serves to secure these parts together and to frictionally hold the slotted end 11a of the saw 11 in place.

Adjacent to the saw blade there is provided a work engaging shoe 26, this shoe being provided with a front edge 26a which is perpendicular to the path of movement of the saw, and respective rounded end portions 26b which are removably received and secured in the body 10. Preferably the shoe 26 is formed of round stock.

Means is provided for enabling a working cut to be started by the saw in a previously unperforated work piece where the saw cuts its own entering hole, and for this purpose a shoe attachment 31 (FIGURES 1, 3 and 4) is provided. The attachment 31 includes a center portion 32 which provides a flat straight surface immediately adjacent the blade 11 and this surface is recessed at 33 to accommodate the blade itself. This center portion 32 is disposed in a plane lying at right angles to the path of movement of the saw and merges with respective rounded end portions 34 which enable rocking engagement of the tool with the work as illustrated in FIGURE 1. Each of the rounded portions 34 is provided with a work penetrating fin 36 which as seen in FIGURE 2 lies in the same plane as the saw blade 11. Each fin 36 is provided with a sharpened or knife-like work penetrating edge which engages with the work and penetrates and holds the tool against accidental lateral movement, or movement out of line from its intended initial position. This enables the support of a relatively long projecting blade while it is making its starting cut in the work as illustrated in FIGURE 1.

On the side opposite to its work engaging surface, the shoe attachment 31 is provided with a laterally facing recess 37 (FIGURE 3) of the same contour and size as the work engaging shoe 26 shown in FIGURE 7 so that the shoe attachment can be fitted on the work engaging shoe. The shoe attachment 31 is provided adjacent each end with a boss 38 (FIGURES 3 and 5) having a threaded aperture 39 to receive in countersunk fashion a fastening screw 41 (FIGURE 1) having its head projecting slightly over the arcuate end portions 37a of the recess 37 to secure the shoe attachment 31 with respect to the work engaging shoe 26.

From the above description it will be seen that the tool of the instant invention is provided with means for penetrating or engaging in a recess in a work piece to provide in effect a steady rest for the tool or saw blade as it engages the work and to prevent straying of the saw blade from its intended path. This path or cut will eventually pass through the indent cut by the fin 36 after the saw is tilted to its perpendicular with reference to the work position as shown in phantom lines in FIGURE 1. In this position the fin 36 is no longer engaged with the work piece and the flat surface 32 is controlling the position of the tool as it performs the sawing operation.

Because both ends of the shoe attachment are of rounded contour and are provided with respective work penetrating fins 36, the saw can be changed from right hand to left hand operation or vice versa by reversing the position of the saw blade in its mounting. It will be noted that the work engaging shoe 26 by virtue of its round contour or cross section in soft material will penetrate the work in the same manner as performed by the fins 36.

The tool body 10 being formed as a hand grip, in operation, the workman holds the tool body as a handle, and the chucking shaft serves as a pivot axis around which the body can be adjusted in performing a cut.

While I have shown a preferred embodiment of the invention it will be understood that the invention is capable of variation and modification from the form shown so that its scope should be limited only by the scope of the claims appended hereto.

I claim:

1. In an attachment for a portable electric drill, a body, reciprocatory means within said body, a saw connected to and driven by said reciprocatory means and projecting from said body, a work engaging shoe secured to said body and including an intermediate shoe portion positioned transverse to the direction of reciprocation of the tool and end portions leading from said intermediate portion to said body, and a shoe attachment detachably connected to said shoe and including a flat work engaging face immediately adjacent said saw and an arcuate end portion leading therefrom, including a work penetrating projection extending parallel to said saw and lying in the same plane.

2. In an attachment for a portable electric drill, a body, reciprocatory means within said body, a saw connected to and driven by said reciprocatory means and projecting from said body, a work engaging shoe secured to said body and including an intermediate shoe portion position transverse to the direction of reciprocation of the tool and end portions leading from said intermediate portion to said body, a shoe attachment detachably connected to said shoe and including a flat work engaging face disposed immediately adjacent said saw and at right angles thereto and arcuate end portions leading therefrom, each of said arcuate end portions including a work penetrating projection extending parallel to said saw and lying in the same plane.

3. A shoe attachment for a power operated saw comprising an intermediate portion of flat contour having a saw blade receiving recess at one side thereof, and respective arcuate end portions leading from said intermediate portion of flat contour, said intermediate portion and said end portions providing work engaging surfaces of the attachment, the other side of said attachment having means to engage a portion of the power operated tool and having securing means mounted thereon, said recess providing for entry of a saw blade therein during securing of the attachment to the saw, in which each said work engaging surfaces of said end portions includes a work-penetrating fin adapted for alignment with the saw blade when the attachment is in place, and serving to penetrate the work and prevent undesired lateral movement of the saw blade during its cutting entry into the work.

4. In an attachment for a portable electric drill and the like, a body structure of elongated longitudinal shape forming a hand grip, said body structure having an apertured boss disposed transverse to the direction of elongation thereof, reciprocatory means mounted in said body structure, means for detachably securing a working tool to said reciprocatory means in reversible relation thereto so that the teeth of the saw blade can be positioned to face in either direction, means for operating said reciprocatory means including a chucking shaft journaled in said boss, said chucking shaft providing for connection to an electric drill, and also providing a pivot axis about which said body structure can be freely rotatively adjusted during use of the attachment, and a work engaging shoe secured to the body structure adjacent the tool and having symmetrical end portions for rocking engagement with the work in either positioning of the tool in said securing means.

5. A shoe attachment for a power operated saw comprising an intermediate portion of flat contour, and an arcuate end portion leading from said intermediate portion of flat contour, said intermediate portion and said end portion providing work engaging surfaces of the attachment, said attachment also having means for connection to the power operated saw, said end portion having an elongated work penetrating projection adapted for alignment with the saw blade when the attachment is in place, and serving to penetrate the work and prevent undesired lateral movement of the saw blade during its cutting entry into the work, said projection being free of the work when said intermediate portion is in flat engagement therewith.

6. In an attachment for a portable electric drill and the like, a body structure of elongated longitudinal shape, reciprocatory means mounted in said body structure, means for detachably securing a saw blade to said reciprocatory means, said securing means being constructed to receive a saw blade with the teeth of the saw blade positioned to face in either one of two directions with respect to the body structure, a work engaging shoe secured to the body structure adjacent the tool end thereof, said shoe having symmetrical rounded end portions for rocking engagement with the work in either positioning of saw blade in said securing mean, in which said work engaging shoe includes a central planar portion for engagement with the work, and respective rounded end portions extending from and merging with said central portion, and having respective elongated fins on said end portions lying in the plane of cutting of said saw blade.

References Cited in the file of this patent

UNITED STATES PATENTS

| | | |
|---|---|---|
| 462,797 | Hazard | Nov. 10, 1891 |
| 2,621,685 | Butz | Dec. 16, 1952 |
| 2,646,094 | Russell | July 21, 1953 |
| 2,668,567 | Olson | Feb. 9, 1954 |
| 2,747,621 | Stone et al. | May 29, 1956 |
| 2,783,790 | Keesling | Mar. 5, 1957 |

OTHER REFERENCES

Ser. No. 374,746, Gubik (A.P.C.), published May 11, 1943.